United States Patent [19]

Weichel

[11] 4,375,836

[45] Mar. 8, 1983

[54] APPARATUS FOR LOOSENING SOIL

[76] Inventor: Ernst Weichel, Postfach 1180, 7326 Heiningen, Fed. Rep. of Germany

[21] Appl. No.: 115,499

[22] Filed: Jan. 25, 1980

Related U.S. Application Data

[63] Continuation-in-part of Ser. No. 45,061, Jun. 4, 1979, abandoned, which is a continuation of Ser. No. 849,800, Nov. 9, 1977, abandoned.

[30] Foreign Application Priority Data

Nov. 19, 1976 [DE] Fed. Rep. of Germany ....... 2652734

[51] Int. Cl.³ .............................................. A01B 13/00
[52] U.S. Cl. ..................................................... 172/40
[58] Field of Search ................. 172/40, 53, 54, 84–89, 172/47, 97, 699, 700, 732, 733, 125; 37/193, DIG. 18

[56] References Cited

U.S. PATENT DOCUMENTS

| 111,404 | 1/1871 | Tice ..................................... 172/84 |
| 500,109 | 6/1893 | Barclay et al. ................... 172/84 X |
| 1,168,813 | 1/1916 | Klopfenstein .......................... 172/84 |
| 1,422,418 | 7/1922 | Colby ................................... 172/699 |
| 3,425,496 | 2/1969 | Shelton ............................... 172/40 |
| 3,685,591 | 8/1972 | Ulrich et al. ..................... 37/193 X |
| 3,971,445 | 7/1976 | Lely ................................ 172/125 X |
| 4,068,722 | 1/1978 | Guelennec ......................... 172/47 X |
| 4,102,403 | 7/1978 | Steinberg ............................. 172/40 |
| 4,111,263 | 9/1978 | Lely .................................... 172/54 |

FOREIGN PATENT DOCUMENTS

| 217205 | 3/1957 | Australia ........................... 172/132 |
| 1782037 | 3/1973 | Fed. Rep. of Germany . |
| 2652734 | 12/1977 | Fed. Rep. of Germany ........ 172/40 |
| 904577 | 3/1945 | France ................................. 172/700 |
| 1022844 | 3/1966 | United Kingdom .................. 37/193 |

OTHER PUBLICATIONS

Pittsburgh Implement Division, Pittsburgh Forgings Co. Advertising Circular for Series 420 V–Chisel, 1–1979.

Primary Examiner—Paul E. Shapiro
Attorney, Agent, or Firm—Toren, McGeady and Stanger

[57] ABSTRACT

Apparatus for loosening soil as it moves over the surface of a field, has a cross-beam and a linkage for connecting the cross-beam to a vehicle, such as a farm tractor, for towing the apparatus over the ground. The cross-beam extends in a direction transverse to the direction of travel and supports a drive shaft having an axis of rotation parallel to the axis of the cross-beam. The drive shaft is connected to the power output of the tractor for rotating the drive shaft as the tractor is advanced. A plurality of discs are spaced along and eccentrically mounted on the drive shaft for eccentric rotation. A swing lever is suspended from each of the discs and a loosening bit is removably carried by each swing lever. Each loosening bit has a transversely extending arrow-shaped blade at the lower end for engaging and loosening the soil. A guide rod is connected between each swing lever and the cross-beam. Accordingly, the swing levers are caused to swing in a plane parallel to the direction of travel and the guide rods restrain the swinging movement to cause the point on the arrow-shaped blade to describe a closed non-circular arcuate path.

7 Claims, 2 Drawing Figures

APPARATUS FOR LOOSENING SOIL

CROSS-REFERENCE TO RELATED APPLICATIONS

This application is a continuation-in-part of application Ser. No. 045,061 filed June 4, 1979, now abandoned, which in turn, was a continuation of application Ser. No. 849,800 filed Nov. 9, 1977, now abandoned.

BACKGROUND OF THE INVENTION

The present invention relates generally to farm implements, and more particularly to a farm implement which can be attached to a farm vehicle for loosening or breaking up the soil in preparation for agricultural use.

Farm implements which can be attached to farm vehicles for breaking up the soil as the vehicle is driven over the surface of a field are, of course, well known and include plows and choppers which have either stationary fingers for engaging and ripping up the soil as the vehicle is advanced, or chisel type loosening bits suspended for swinging movement and which carry blades generally inclined to the direction of travel. The advantage of using the swinging loosening bits is that the soil can be loosened and aerated while preserving its natural stratification. In addition, the swinging movement of the loosening bits tend to assist in the forward advance of the implement along the surface of the ground and thus minimizes the power required to pull the implement. This advantage is a result of each loosening bit resting on the surface of the soil during at least a portion of time that the implement is being advanced rather than constantly engaging the soil and presenting resistance to forward movement.

One such type of farm implement for loosening soil having loosening bits suspended for swinging movement, is shown in German Pat. No. 1 782 037. In this German patent the loosening bits are carried for vertical adjustment on swing levers which are suspended in a side-by-side arrangement on a supporting frame. The various swing levers are driven for swinging movement by a cross-shaft which, in turn, is driven through a miter gear connection from a power output of the farm vehicle. The cross-shaft carries spaced eccentric discs with connecting rods positioned between the discs and supporting the swing levers. In this manner, the loosening bits are caused to move back and forth in a circular path as the farm vehicle drives the cross-shaft. The center of the circular path is formed by the upper pivot point of the swing levers on the supporting frame.

The swinging back and forth movement adequately breaks up the soil, however, it has a tendency to force clumps or clods of soil out of the ground without sufficiently crushing such clumps or clods. Also, because each loosening bit will simply rest in the soil during a portion of the forward movement of the vehicle and the apparatus, it will effectively be moving in a return direction at a speed equal to the forward travel of the vehicle resulting in a disproportionately high power consumption on the power output of the vehicle. Additionally, the stationary positioning of the loosening bits on the ground tends to cause the entire implement to rise slightly as it passes over the loosening bit. This is particularly true when attempting to loosen very firm soil and to a somewhat lesser degree when the soil is relatively soft, in which case the loosening bit will tend to sink into the soil as the implement rides over it. This results in uneven and unsteady operation of the implement as it rides over the surface of the soil.

Therefore, it is the primary object of the invention to provide an apparatus for loosening soil, intended for attachment to a farm vehicle, which has movable loosening bits for engaging and breaking up the soil in a manner which produces more complete crushing of the soil and which minimizes power consumption by the farm vehicle required for driving the implement.

SUMMARY OF THE INVENTION

The foregoing object is accomplished by providing an apparatus for loosening soil which comprises a cross-beam, means connecting the cross-beam to the farm vehicle for advancing the apparatus over the surface of the soil in a field in a direction transverse to the longitudinal axis of the cross-beam, a drive shaft supported by the cross-beam having an axis of rotation parallel to the longitudinal axis of the cross-beam, means connecting the drive shaft to the power output of the vehicle for rotatably driving the drive shaft, a plurality of discs spaced along and eccentrically mounted on the drive shaft for rotation with the drive shaft, a swing lever carried on each of the discs and supporting a loosening bit for engaging and loosening the soil, and a guide rod interconnecting each swing lever to the cross-beam.

As a result of this structure, the swing levers are caused to swing in a direction parallel to the direction of travel of the apparatus as the discs are eccentrically driven, and the guide rods tend to restrict the swinging movement of the swing levers to cause a point on the loosening bit to travel in a closed non-circular arcuate path. The closed arcuate path is superimposed on the forward movement of the advancing apparatus resulting in a more efficient and complete crushing of the soil thereby improving the loosening and aeration of the soil. This is a result of the loosening bits cutting into the soil while moving along the bottom of the closed arcuate path. Additionally, the operation of the implement is steadier than the prior type device, because the cutting point of the loosening bit does not simply rest in the soil as the vehicle rides over it but as it moves along the upper portion of the closed arcuate path, it moves in a relative backward direction through the loosened soil. The ultimate result is lower power consumption of the vehicle. The apparatus of the present invention also tends to assist in the forward advancement of the implement as a result of the loosening bit moving in a relative backward direction and the friction developed between the loosening bit and the loosened soil.

A preferred example of the present invention will be more specifically described with reference to the following drawings annexed hereto.

DESCRIPTION OF THE INVENTION

Figure 1:
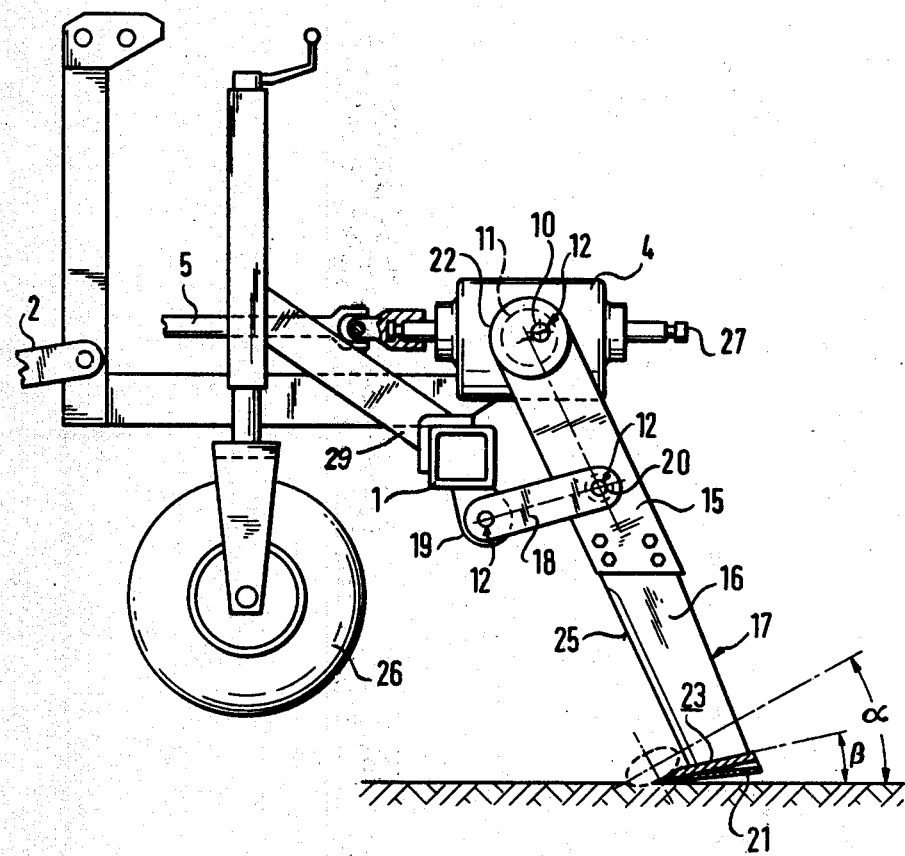
FIG. 1 is a schematic side elevational view showing the apparatus according to the present invention.
Figure 2:
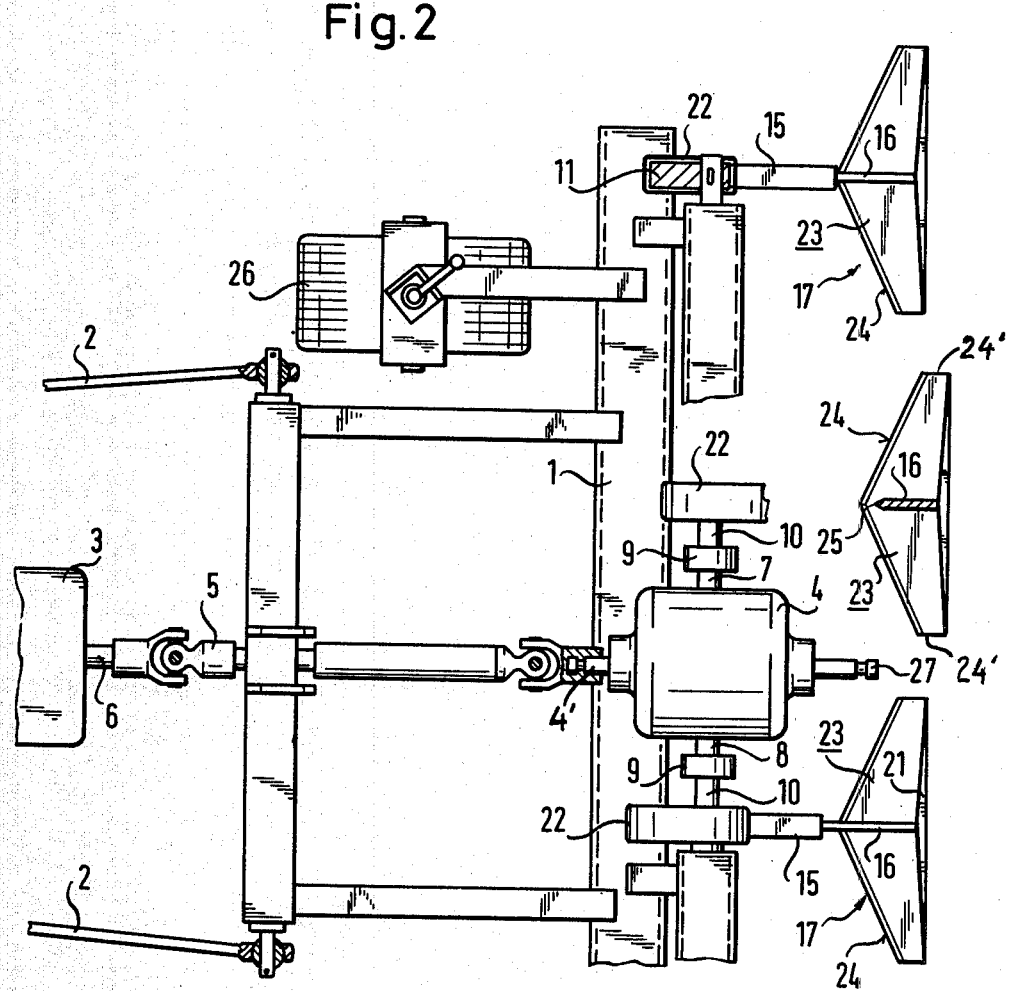
FIG. 2 is a top plan view of the apparatus shown in FIG. 1, with portions broken away for clarity.

Referring now to the accompanying drawings, the apparatus for loosening soil includes a main support element in the form of a generally horizontally positioned cross-beam 1. The cross-beam 1 can be connected in a known manner to a farm vehicle such as a tractor 3 by a typical three point linkage 2 or any other suitable coupling mechanism. The cross-beam 1 supports a gear box containing a known bevel gear transmission. Input shaft 4' is driven through universal couplings, and a connecting shaft 5 by a power output shaft 6 of the tractor 3. Shaft 4' therefore drives output shafts 7, 8 and 27 through gear box 4. Shafts 7 and 8 have an axis of rotation which extends in a direction parallel to the longitudinal axis of the cross-beam 1, which is transverse to the direction of travel of the vehicle and of the soil loosening apparatus. A drive shaft section 10 is connected to each of the shafts 7 and 8 through elastic couplings 9. Drive shaft sections 10 also extend in the direction parallel to the longitudinal axis of cross-beam 1.

Discs 11 are rigidly connected to and eccentrically mounted on each drive shaft section 10. The discs are spaced laterally apart. Discs 11 are, therefore, caused to rotate eccentrically of the axis of the shaft sections 10 as the drive shaft is driven. A bearing sleeve 22 surrounds each of the eccentric discs 11 and supports a swing lever 15 on the disc. A chisel type loosening bit 17 is detachably connected to the bottom of each swing lever either by nuts and bolts, such as illustrated in the drawings, or by any other suitable means. The swing lever 15 and loosening bits 17 extend downwardly and rearwardly from the bearing sleeve 22 relative to the direction of travel. The swing levers are preferably provided with a slot at their bottom ends for receiving the loosening bits 17 rather than being carried in an offset manner. Each loosening bit has a downwardly depending extension arm 16 and a soil engaging blade 23 at the lower end of the arm.

Lugs 19 are secured to the underside of the cross-beam 1 and are positioned in the vicinity of each of the swing levers 15. A guide rod 18 is pivotally connected at one end to each lug 19 and is pivotally connected at the other end at a hinge or pivot point 20 to one of the swing levers 15. The pivot connections of guide rods 18 to lugs 19, the pivot points 20, and the axis of shaft sections 10 and of the eccentric discs 11 form the points of a four-joint drive linkage, indicated generally by the reference numerals 12. Eccentric 11, swing lever 15 and guide rod 18 form the movable links of the drive linkage 12. The pivot points and links of the four-joint drive linkage are arranged and dimensioned such that a point on the lower end of loosening bit 17 engaging the soil will describe approximately a closed non-circular arcuate or elliptical path during a single revolution of the eccentric disc 11. Preferably, the dimensions of the elements will be such that the major or longitudinal axis of the ellipse will form an angle $\alpha$ of approximately 25–40 degrees with the horizontal or the surface of the soil, with the angle opening in the direction opposite to the direction of travel.

Each blade 23, located at the bottom of one of the extension arms 16, has forwardly facing cutting edges 24 which are generally arrow-shaped with the apex or point of the arrow-shaped edges extending in the direction of travel. The apex of the cutting edges 24 is positioned approximately 50 millimeters beyond the front edge 25 of the extension arms 16. The front edge 25 of extension arm 16 is chisel-shaped or V-shaped to facilitate cutting the soil by the extension arm. Additionally, the soil will ride up onto the blade as it is loosened and be engaged by the V-shaped front edge 25 to assist in breaking up large clumps or clods which are dislodged from the ground.

Each blade 23 has side edges 24', extending transversely of the cutting edges, which are approximately 35 millimeters long and the width of each blade from side edge to side edge is approximately 450 millimeters, with the length from the apex of the cutting edge to the trailing edge being approximately 160 millimeters.

Each swing lever 15 is mounted on its respective bearing sleeve 22 forming an angle with a line normal to the surface of the ground. In this position, the upper surface of the blade 23 forms an angle $\beta$ with the surface of the ground, the line parallel to the upper surface of the blade 23 extending in an upward direction opposite to the direction of travel. When viewed from the rear, each blade 23 is V-shaped to assist further in the crushing of the soil. Additionally, a cross-plate or support rib 21 will be positioned beneath each blade for reinforcement. Preferably angle $\alpha$ is about twice the size of angle $\beta$. The ratio between the major or longitudinal axis of the elliptical path and the transverse or minor axis of the elliptical path is preferably about 2:1. The eccentricity of each eccentric disc with respect to the axis of rotation of drive shaft 10 is approximately 20 millimeters and the length of the longitudinal axis of the elliptical path is approximately 60 millimeters.

The embodiment shown has four blades, however, the present invention could operate satisfactorily with only two blades, one positioned on either side of the gear box 4. With four blades, two are located on one side of gear box 4 and driven by the blade shaft 10 coupled to shaft 7, while the other two are driven by the drive shaft 10 coupled to shaft 8 on the opposite side of the gear box 4. Accordingly, two eccentric discs are carried on each drive shaft 10, on each side of the gear box 4. In each pair, the eccentric discs are preferably offset or displaced from each other relative to the shaft axis by 180 degrees. In other words, the direction of eccentricity of one eccentric disc will be opposite to that of the other eccentric disc carried on the same drive shaft 10. Additionally, relative to the axis of the drive shaft 10 the eccentric discs carried on the drive shaft 10 on one side of the gear box is displaced by 45 degrees from the eccentric discs carried on the drive shaft 10 on the other side of the gear box 4. As a result of the relative angular displacement of the eccentric discs, only one blade 23 will be in the lowermost position in the ground at a time. Accordingly, sufficient mass equilibrium is ensured. Additionally, this arrangement avoids torque peaks.

A pair of support wheels 26 are rotatably carried on a vertically adjustable column for supporting the cross-beam 1. Appropriate means such as hand cranks are provided to adjust the vertical height of the rollers 26 with respect to the cross-beam 1 to permit adjustment of the working depth of the blades 23. The wheels 26 and their supporting columns, are positioned in front of the cross-beam 1 with respect to the direction of travel and an angle bar 29 connects the vertically adjustable column with the cross-beam 1. In this manner, the apparatus can be supported on wheels 26 for forward advancement with the farm vehicle or tractor 3.

Gear box 4 has an additional rear output shaft 27 which may be used for driving an additional farm implement connected in trailing relationship with the soil loosening apparatus of the present invention.

In operation, driving power is delivered from the output shaft 6 through connecting shaft 5 and universal couplings to the input shaft 4' of gear box 4 thus driving the shafts 7 and 8 and consequently the drive shafts 10 each of which is coupled to a different one of the shafts 7 and 8. Eccentric discs 11, which are secured to the drive shafts 10, are rotated and each swing lever 15 supported on a bearing sleeve 22, surrounding one of the discs 11, is thereby caused to move in a swinging manner in a plane substantially parallel to the direction of travel. As a result of the guide rod 18 connected at pivot point 20 to each of the swing levers 15, the swinging movement of the lever 15 is limited by the formation of the four-point drive 12. As a result, the loosening bit 17 will describe an elliptical path having a major axis forming an angle α with the horizontal or the surface of the ground of between 25 and 40 degrees which is approximately twice the angle β formed by the upper surface of the blades 23 with the horizontal. Because of the angular arrangement of the eccentric discs carried along the shafts 10 only one blade at a time is located at the lowest portion. Since each loosening bit and its soil engaging blade is driven in an elliptical path, the cutting action takes place along the lower portion of the ellipse while the return action takes place along the upper portion of the ellipse thus avoiding the disadvantages of the prior art where the loosening bits remain stationary in the earth.

While the present embodiment illustrates a substantially U-shaped frame connected to the cross-beam 1 for removable coupling to the tractor, other suitable and well known means for coupling the cross-beam to the tractor could be used with adequate results.

While the invention has been described and illustrated with respect to a certain preferred embodiment which produces satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. An apparatus arranged to be pulled by a drive vehicle, such as a tractor, over the surface of a field for loosening soil in preparation for agricultural use, comprising an elongated cross-beam extending generally horizontally and transversely of the direction of travel of said apparatus, a drive shaft mounted on and extending in generally parallel relation with said cross-beam, means for driving said drive shaft, at least two upwardly extending swing levers each having a first end mounted on said drive shaft and a second end spaced outwardly and downwardly from said drive shaft, said swing levers spaced apart along the axis of rotation of said drive shaft, a loosening bit attached to each said swing lever, each said loosening bit having a first end and a second end with the first end of said loosening bit attached to the second end of said swing lever and the second end of said loosening bit extending downwardly therefrom so that said loosening bit can extend into the soil for effecting a loosening action, wherein the improvement comprises a disc rigidly connected to each said swing lever and eccentrically mounted on said drive shaft so that said disc rotates with said drive shaft, said drive shaft spaced rearwardly and upwardly from said cross-beam, a guide rod for each said swing lever with said guide rod pivotally connected at one end to said swing lever intermediate the first and second ends thereof and means connected to said cross-beam for pivotally connecting the other end of said guide rod to said cross-beam forwardly of said swing lever, said swing levers and soil loosening bits extending downwardly in the rearward direction from said dicsc, a soil engaging blade attached to the second end of each said soil loosening bit and extending transversely outwardly and generally horizontally from both sides of said blade, said soil engaging blades each have a front edge facing in the direction of travel of said apparatus and an oppositely directed trailing edge, said front edge is V-shaped in horizontal plan with the apex of the V-shaped front edge aligned forwardly of said loosening bit and the sides of the V-shaped front edge sloping from the apex in the opposite direction from the direction of travel of said apparatus, the combination of the eccentric connection of said swing levers over said discs to said drive shaft, the downward and rearward orientation of said levers and loosening bits, and the pivotal connection of said swing levers via said guide rods to said cross-beam causes said soil engaging blades at the second ends of said loosening bits to describe a substantially closed non-circular arcuate path having a major axis extending generally in the direction of travel of said apparatus and a minor axis extending tranversely of the major axis, the ratio of the length of the major axis of the closed arcuate path to the length of the minor axis of the closed arcuate path is 2:1, the angle between the major axis of the closed arcuate path and the surface of the field over which the apparatus travels is in the range of 25 degrees and 40 degrees, the major axis slopes upwardly in the direction opposite to the direction of travel of the apparatus, each said soil engaging blade has an upwardly facing surface arranged at an angle to the surface of the field over which the apparatus travels in the range of from one-half the angle between the major axis of the closed arcuate path and the surface of the field over which said apparatus travels to the angle between the major axis of the closed arcuate path and the surface of the field over which the apparatus travels, said means for driving said drive shaft comprises an input shaft located approximately midway between the ends of said cross-beam, said drive shaft comprising a gear box connected to said input shaft, a first drive section extending from said gear box outwardly toward one end of and in generally parallel relation with said cross-beam, a second drive shaft section extending from said gear box outwardly toward the other end of and in generally parallel relation with said cross-beam, at least one said disc connected to each of said first and second drive shaft sections, and said at least one disc on said first drive shaft section being spaced 45 degrees apart from the corresponding said at least one disc on said second drive shaft section relative to the axis of said drive shaft.

2. An apparatus, as set forth in claim 1, wherein the eccentricity of said discs relative to the axis of said drive shaft is 20 mm, and the length of the major axis of the closed arcuate path is 60 mm.

3. An apparatus, as set forth in claim 1, wherein the apex of said V-shaped front edge being spaced from the edge of said loosening bit facing in the direction of travel of said apparatus by an amount less than the length of the major axis of the closed arcuate path.

4. An apparatus, as set forth in claim 3, wherein the edge of said loosening bit depending downwardly from said swing lever and facing in the direction of travel of said apparatus is chisel-shaped, and said soil engaging blade includes a reinforcing plate attached to the lower surface thereof.

5. An apparatus, as set forth in claim 1, wherein a vertically adjustable member is attached to and extends downwardly from said cross-beam, and at least one support wheel attached to the lower end of said vertically adjustable member.

6. An apparatus, as set forth in claim 1, wherein said gear box includes bevel gearing for interconnecting said input shaft to said first and second drive shaft sections.

7. An apparatus, as set forth in claim 1, wherein a pair of said discs are connected to each of said first and second drive shaft sections with said discs on each of said drive shaft sections being spaced apart in the direction of said cross-beam, and the eccentric mounting of said discs on each of said first and second drive sections being spaced 180 degrees apart relative to one another with respect to the axis of said drive shaft.

* * * * *